United States Patent
Daikokuya et al.

(10) Patent No.: US 7,383,482 B2
(45) Date of Patent: Jun. 3, 2008

(54) ABNORMALITY DETECTING DEVICE AND METHOD OF DETECTING AN ABNORMALITY IN A HEAD OF HARD DISK

(75) Inventors: Hidejirou Daikokuya, Kawasaki (JP); Mikio Ito, Kawasaki (JP); Kazuhiko Ikeuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 293 days.

(21) Appl. No.: 10/936,663

(22) Filed: Sep. 9, 2004

(65) Prior Publication Data
US 2005/0219726 A1 Oct. 6, 2005

(30) Foreign Application Priority Data
Mar. 31, 2004 (JP) .............................. 2004-105094

(51) Int. Cl.
  G01R 31/28 (2006.01)
  G06F 11/00 (2006.01)
(52) U.S. Cl. ...................................... 714/738; 714/742
(58) Field of Classification Search ................ 714/719, 714/763, 770, 42; 360/53
See application file for complete search history.

(56) References Cited

U.S. PATENT DOCUMENTS 6,922,801 B2 * 7/2005 Archibald et al. .......... 714/723
2004/0015762 A1 * 1/2004 Klotz et al. ................. 714/742

FOREIGN PATENT DOCUMENTS

| JP | 07-141660 | 6/1995 |
| JP | 07-253857 | 10/1995 |
| JP | 7-306812 A | 11/1995 |
| JP | 2001-035096 | 2/2001 |

OTHER PUBLICATIONS

Japanese Office Action dated Oct. 23, 2007 for corresponding Japanese Application No. 2004-105094.

* cited by examiner

Primary Examiner—James C. Kerveros
(74) Attorney, Agent, or Firm—Staas & Halsey LLP

(57) ABSTRACT

An input/output device includes a creating unit that creates a first data pattern that is different from a second data pattern created last time, a writing unit that writes the first data pattern as a written data pattern, and a judging unit that reads out a data pattern written in the input/output device as a read data pattern and judges whether the written data pattern and the read data pattern coincide with each other.

11 Claims, 5 Drawing Sheets

ABNORMALITY DETECTING DEVICE AND METHOD OF DETECTING AN ABNORMALITY IN A HEAD OF HARD DISK

BACKGROUND OF THE INVENTION

1) Field of the Invention

The present invention relates to a technology for judging accurately whether there is an abnormality in a head of hard disk.

2) Description of the Related Art

Conventionally, a disk array device that divides and writes data in plural hard disks has been known. For example, in a disk array device having first to fourth hard disks, when the disk array device receives data A, B, C, D, E, and F in order from a host computer, the disk array device writes the data A, C, and E in the first hard disk, writes the data B, D, and F in the second hard disk, writes the data A, C, and E in the third disk, and writes the data B, D, and F in the fourth disk.

Since the disk array device divides and writes the data in the first to the fourth hard disks in this way, a data transfer speed can be increased. In addition, since the disk array device writes the data, which are identical with those written in the first and the second hard disks, in the third and the fourth hard disks, even when the first and the second hard disks break down, likelihood of losing the data can be reduced.

In addition, the conventional disk array device checks heads included in hard disks periodically to judge whether data can be recorded in the hard disks accurately.

More specifically, the disk array device writes binary data called a data pattern in areas where the heads of the hard disks are checked. Then, the disk array device reads the data pattern and judges whether the written data pattern and the read data pattern coincide with each other to detect abnormality in the heads.

An input/output control device described in, for example, Japanese Patent Application Laid-Open Publication No. H7-306812 writes data in a disk, executes reading of the written data, and when a reading error occurs, judges that there is an abnormality in the head of the hard disk.

However, with the conventional techniques the abnormality in the head cannot always be detected accurately.

For example, the conventional method detects the abnormality in the head using one kind of data pattern. When abnormality occurs in a write head and the data pattern cannot be written accurately, data written previously is read out when the data pattern is read. In this case, since data pattern written previously is identical with the data pattern attempted to be written, the written pattern and the read pattern coincide with each other, and the disk array device misjudges that the write head is in a normal condition.

In addition, even when the abnormality in the head is detected from occurrence of a reading error, it cannot always be judged that there is an abnormality in the head because the reading error may result from a cause other than the abnormality in the head.

SUMMARY OF THE INVENTION

It is an object of the present invention to solve at least the above problems in the conventional technology.

An input/output device according to one aspect of the present invention includes a creating unit that creates a first data pattern that is different from a second data pattern created last time; a writing unit that writes the first data pattern as a written data pattern; and a judging unit that reads out a data pattern written in the input/output device as a read data pattern and judges whether the written data pattern and the read data pattern coincide with each other.

An input/output device according to another aspect of the present invention includes a data pattern creating unit that creates discriminating information for discriminating the data pattern from user data and inserts the discriminating information in the data pattern.

A disk array device according to still another aspect of the present invention includes a creating unit that creates a first data pattern that is different from a second data pattern created last time such that identical data patterns do not continue; a writing unit that writes the first data pattern in the hard disk as a written data pattern; and a judging unit that reads a data pattern from the hard disk as a read data pattern and judges whether the written data pattern and the read data pattern coincide with each other.

A patrol method according to still another aspect of the present invention includes creating a first data pattern that is different from a second data pattern created last time; writing the first data pattern as a written data pattern; reading out a data pattern written in the input/output device as a read data pattern; and judging whether the written data pattern and the read data pattern coincide with each other.

The other objects, features, and advantages of the present invention are specifically set forth in or will become apparent from the following detailed description of the invention when read in conjunction with the accompanying drawings.

DETAILED DESCRIPTION

Exemplary embodiments of an input/output device and a patrol method according to the invention will be explained in detail with reference to the accompanying drawings.

Figure 1:
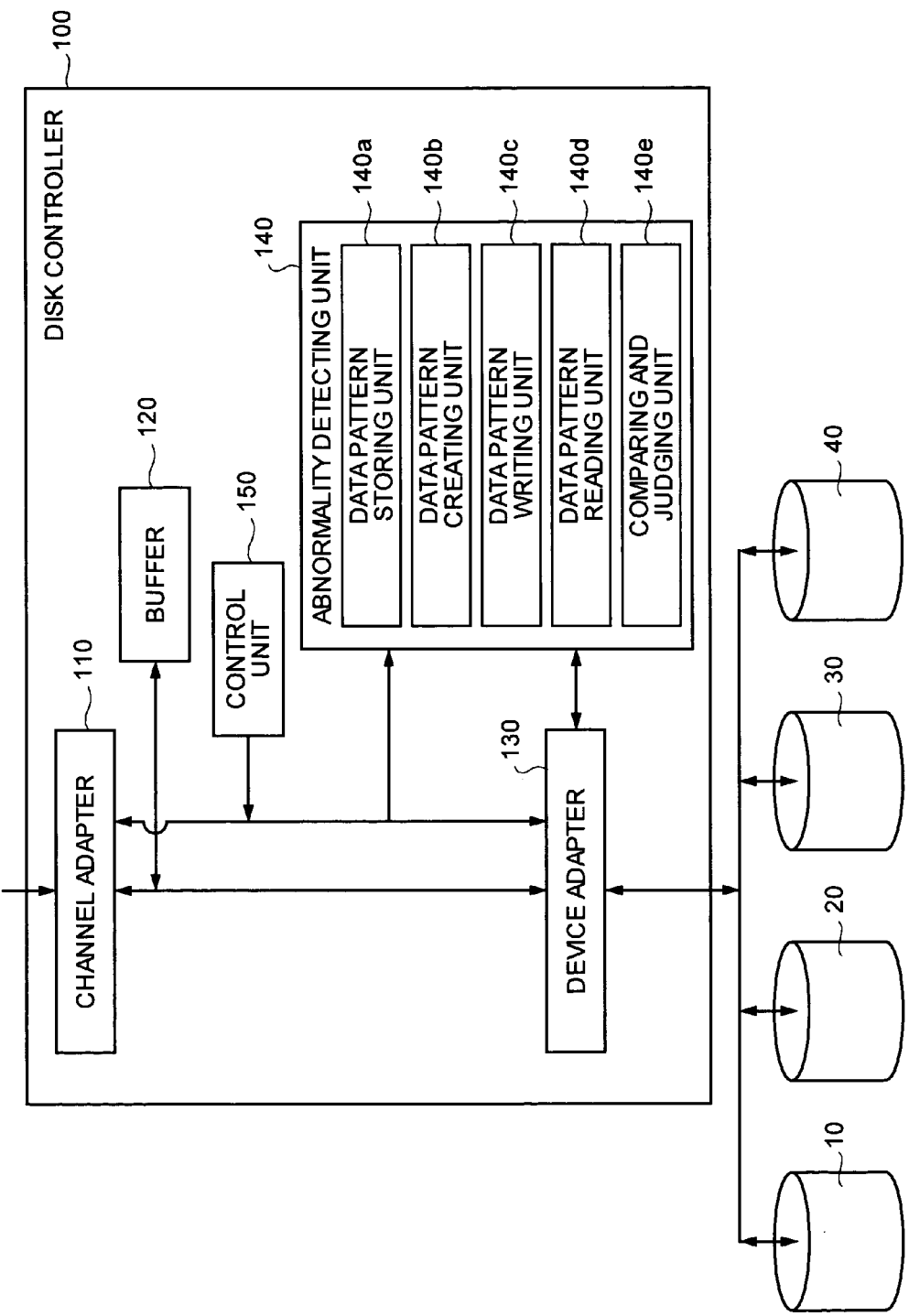
FIG. 1 is a block diagram of a structure of a disk array device according to an embodiment of the invention.

FIG. 1 is a block diagram of a structure of the disk array device according to an embodiment of the present invention. As shown in the figure, the disk array device includes hard disks 10, 20, 30, and 40 and a disk controller 100.

The hard disks 10, 20, 30, and 40 are storages that store data. Note that, although only the four hard disks 10, 20, 30, and 40 are described in this specification for convenience of explanation, the disk array system consists of an arbitrary number of hard disks.

Figure 2:
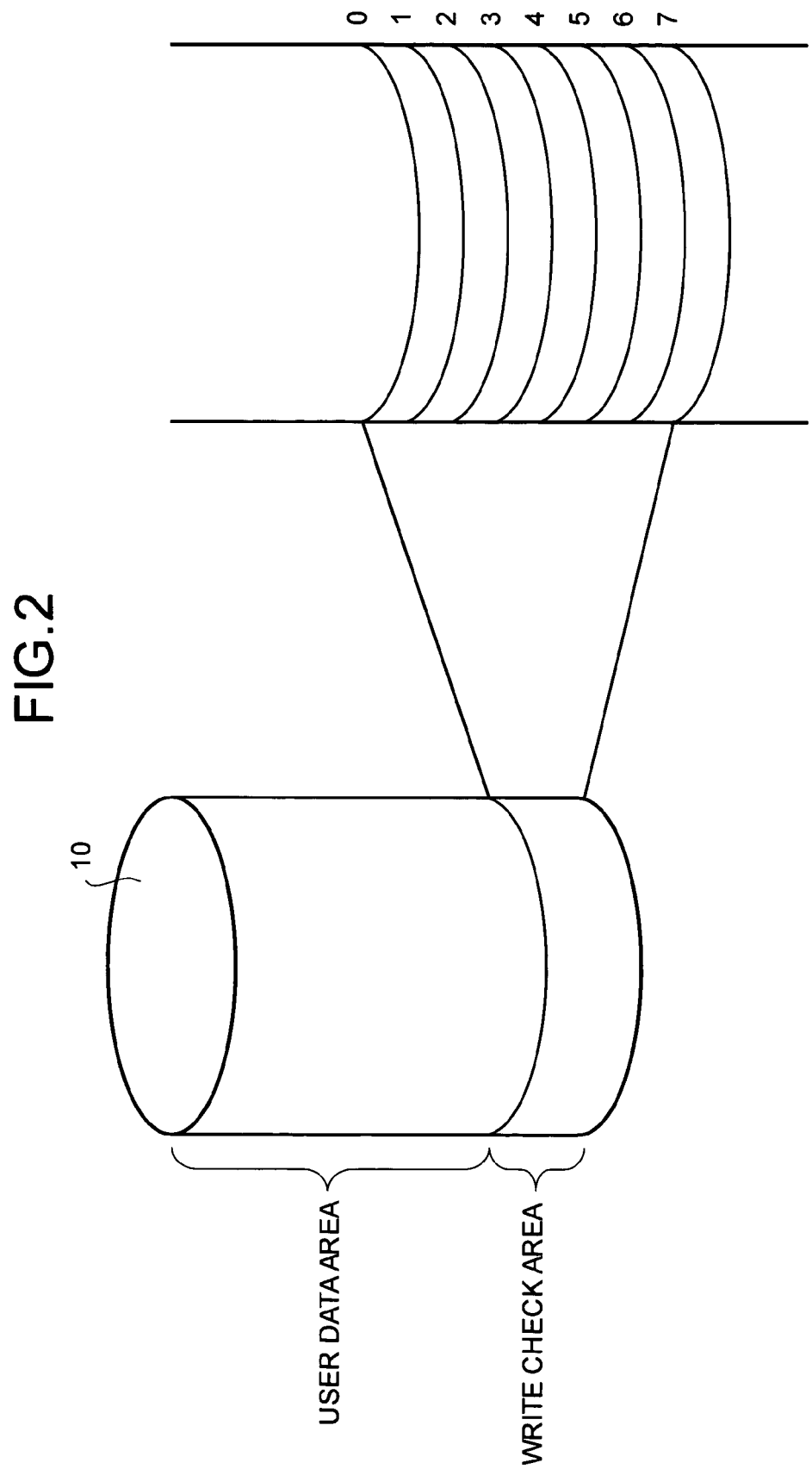
FIG. 2 is a diagram of a logical structure of a hard disk.

FIG. 2 shows a logical structure of the hard disk 10. As shown in FIG. 2, the hard disk 10 includes a user data area for storing user data and a write check area that is used when it is judge whether heads of the hard disk 10 are normal. Note that, although the hard disks 20, 30, and 40 are not explained here, the hard disks 20, 30, and 40 have the same logical structure as the hard disk 10 shown in FIG. 2.

In addition, the hard disk 10 includes the write check areas numbered 0 to 7 corresponding to heads numbered 0 to 7. The write check areas corresponding to the respective heads are secured in this way, whereby it can be checked whether all the heads are normal. Note that what is shown in FIG. 2 is a logical structure of a hard disk, and actually, both a user data area and a write check area are present on respective disks included in the hard disk.

The disk controller 100 periodically judges whether heads for writing data in the hard disks 10, 20, 30, and 40 are normal (processing for periodically judging whether heads are normal is represented as write check).

When the disk controller 100 judges that a head is not normal as a result of performing the write check, the disk controller 100 separates a hard disk, which includes the head judged as abnormal, from the disk array device.

The disk controller 100 can store data in normal hard disks by judging whether the heads are normal and separating the hard disk including the abnormal head from the disk array system in this way.

As shown in FIG. 1, the disk controller 100 includes a channel adapter 110, a buffer 120, a device adapter 130, an abnormality detecting unit 140, and a control unit 150.

The channel adapter 110 receives data from a host computer and stores the received data in the buffer 120. In addition, when a request for data is received from the host computer, the channel adapter 110 acquires the data from the hard disks 10, 20, 30, and 40 via the device adapter 130 and the buffer 120 and passes the acquired data to the host computer.

The device adapter 130 acquires the data, which is stored in the buffer 120 by the channel adapter 110, and divides and writes the acquired data in the hard disks 10, 20, 30, and 40. In addition, the device adapter 130 reads data from the hard disks 10, 20, 30, and 40 and stores the read data in the buffer 120.

The abnormality detecting unit 140 is a processing unit that applies a write check to the heads included in the hard disks 10, 20, 30, and 40. The abnormality detecting unit 140 includes a data pattern storing section 140a, a data pattern creating section 140b, a data pattern writing section 140c, a data pattern reading section 140d, and a comparing and judging section 140e.

The data pattern storing section 140a stores a data pattern of one byte. This data pattern is used when the write check is performed. Note that, as described later, the data pattern of one byte stored in the data pattern storing section 140a is updated by the data pattern creating section 140b every time the write check is performed.

The data pattern creating section 140b creates a data pattern to be written in write check areas using the data pattern of one byte stored in the data pattern storing section 140a. More specifically, the data pattern creating section 140b adds 1 to the data pattern of one byte acquired from the data pattern storing section 140a and arranges 520 new data patterns added with 1 to create a data pattern to be written in the write check areas. The data pattern obtained by adding 1 to the data pattern of one byte stored in the data pattern storing section 140a will be hereinafter represented as new data pattern of one byte.

Figure 3:
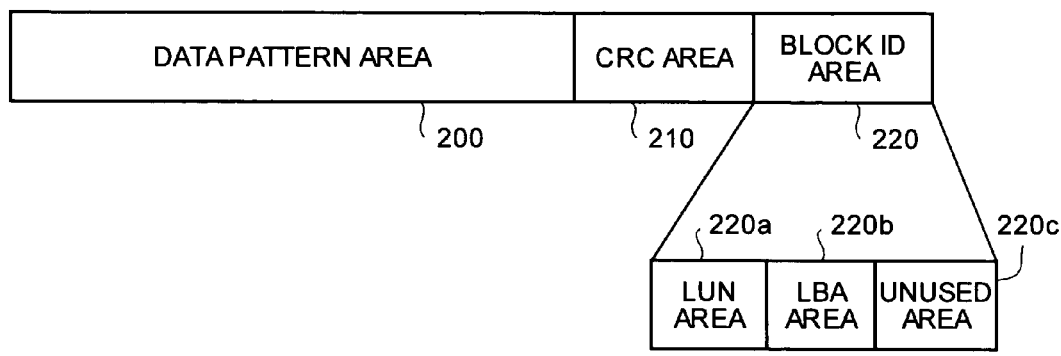
FIG. 3 is a diagram of a structure of a data pattern.

As shown in FIG. 3, a data pattern consists of a data pattern area 200, a cyclic redundancy check (CRC) area 210, and a block identification (ID) area 220. The Block ID area 220 includes a logical unit number (LUN) area 220a, a logical block addressing (LBA) area 220b, and an unused area 220c.

The CRC area 210 is usually used for detecting an error in data. However, in this embodiment, wrong CRC data is stored in the CRC area 210 intentionally as described later.

LUN data to be stored in the LUN area 220a is a serial number in the disk array device corresponding to a logical device address that is referred to from the host, and LBA data to be stored in the LBA area 220b is an address of a logical block in the LUN data. The LUN data and the LBA data are used for ensuring a position of data stored in a hard disk. The unused area 220c is usually a part to which data is not inputted.

The data pattern creating section 140b updates an old data pattern of one byte stored in the data pattern storing section 140a to a new data pattern of one byte. By always updating a data pattern of one byte, a data pattern to be created by the data pattern creating section 140b can be changed every time write check is performed.

In addition, when CRC data stored in the CRC area 210 is consistent with data stored in the data pattern area 200, the data pattern creating section 140b changes the data stored in the data pattern area to wrong CRC data that is inconsistent with the CRC data stored in the CRC area 210.

Moreover, the data pattern creating section 140b stores data in the unused area 220c.

When data is read out, the disk controller 100 usually detects a reading error based on data stored in the CRC area 210 or the Block ID area 220. However, for example, when abnormality occurs in a write head, a data pattern for write check is written in user data. In this case, when the data written in the CRC area 210 is consistent with the read-out data, it is highly likely that the disk controller 100 misunderstands that the read-out data pattern for write check is normal user data.

However, CRC data, which is different from an original CRC data, is intentionally written in the CRC area 210 and data is written in the unused area 220c as described above. Consequently, even if a data pattern is written in a user data area by mistake as described above, since the CRC data is inconsistent with the data stored in the data pattern area 200 and data is written in the unused area 220c in which data is not present originally, the disk controller 100 can recognize that the read-out data is not correct and detect an error.

In such a case, a normal user data written in the user data area is broken. However, this makes it possible to return the normal user data to the host from the hard disks, which constitute the disk array redundantly, and wrong data is never returned to the host.

The data pattern writing section 140c receives a data pattern from the data pattern creating section 140b and writes the received data pattern in a write area of a corresponding hard disk via the device adapter 130. Note that the data pattern writing section 140c receives a data pattern, which is different from a data pattern received last time, from the data pattern creating unit 140b every time write check is performed.

Since the data pattern writing section 140c receives a data pattern, which is different from a data pattern received last time, every time write check is performed in this way, the disk controller 100 can judge accurately whether data is normally written in heads.

The data pattern reading section 140d reads a data pattern from the write check area of the corresponding hard disk.

The comparing and judging section 140e compares the data pattern written by the data pattern writing section 140c (hereinafter represented as written data pattern) and the data pattern read by the data pattern reading section 140d (hereinafter represented as read data pattern) and judges whether the written data pattern and the read data pattern coincide with each other.

When the comparing and judging section 140e judges that the written data pattern and the read data pattern do not coincide with each other, the comparing and judging section 140e judges that there is an abnormality in the heads, and separates a hard disk including a head having the abnormality.

When the comparing and judging section 140e judges that the written data pattern and the read data pattern coincide with each other, since the heads are normal, the hard disks continue to be used.

The control unit 150 controls the channel adapter 110, the device adapter 130, and the abnormality detecting unit 140.

Figure 4:
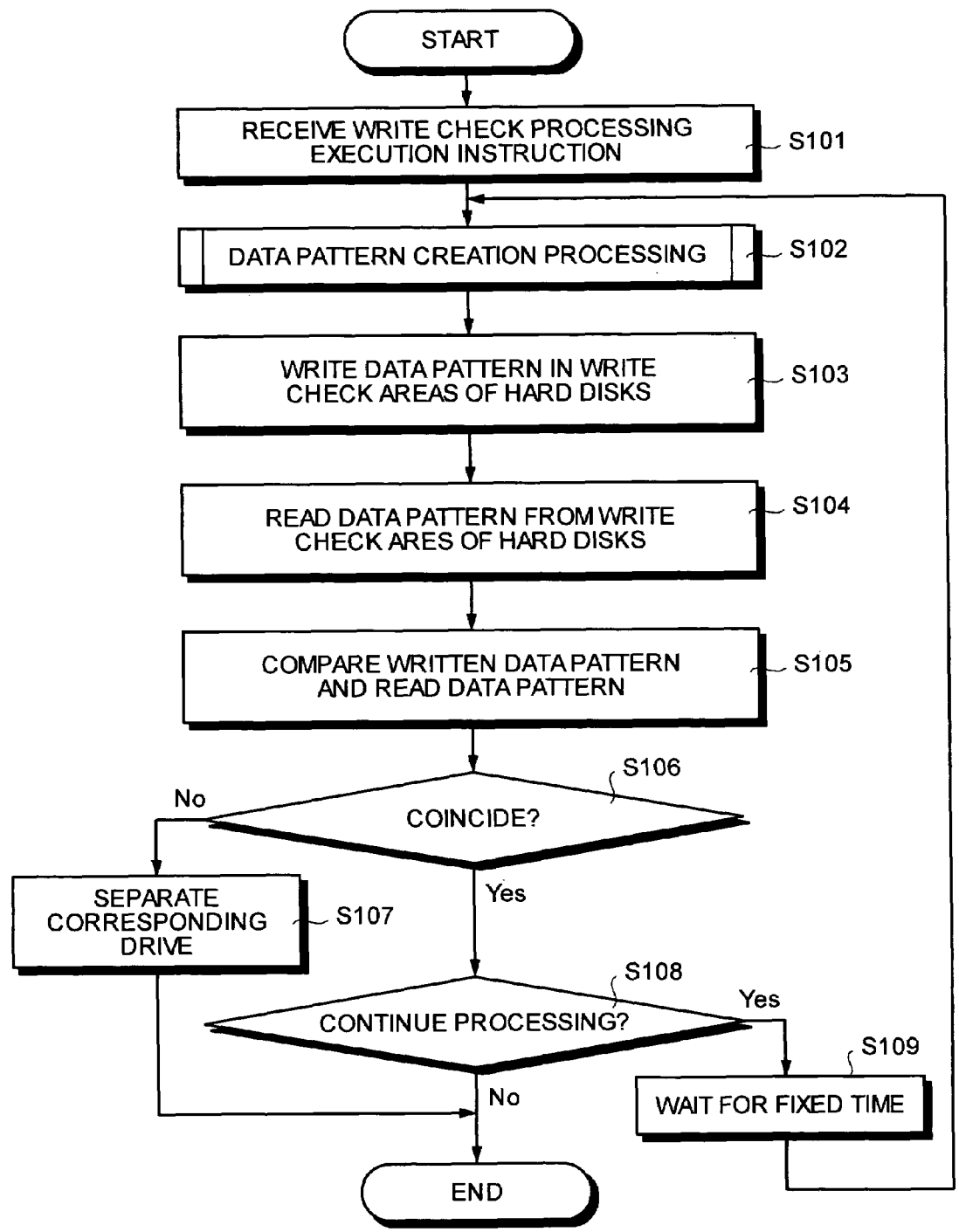
FIG. 4 is a flowchart of a processing procedure in which an abnormality detecting unit performs write check.

FIG. 4 is a flowchart of the processing procedure in which the abnormality detecting unit 140 performs write check. As shown in the figure, the abnormality detecting unit 140 receives a write check processing execution instruction from the control unit 150 (step S101), and the data pattern creating section 140b performs data pattern creation processing (step S102).

Then, the data pattern writing section 140c writes a data pattern in write check areas of hard disks (step S103), and the data pattern reading section 140d reads the data pattern from the write check areas of the hard disks (step S104).

Then, the comparing and judging section 140e compares the written data pattern and the read data pattern (step S105) and, if the written data pattern and the read data pattern do not coincide with each other (No in step S106), separates a corresponding hard disk (step S107).

On the other hand, if the written data pattern and the read data pattern coincide with each other (Yes in step S106), the abnormality detecting unit 140 judges whether the write check processing should be continued (step S108). If the abnormality detecting unit 140 judges the processing should be continued (Yes in step S108), the abnormality detecting unit 140 waits for a fixed time (step S109) and shifts to step S102. If the abnormality detecting unit 140 judges that the processing should not be continued (No in step S108), the abnormality detecting unit 140 ends the processing.

Figure 5:
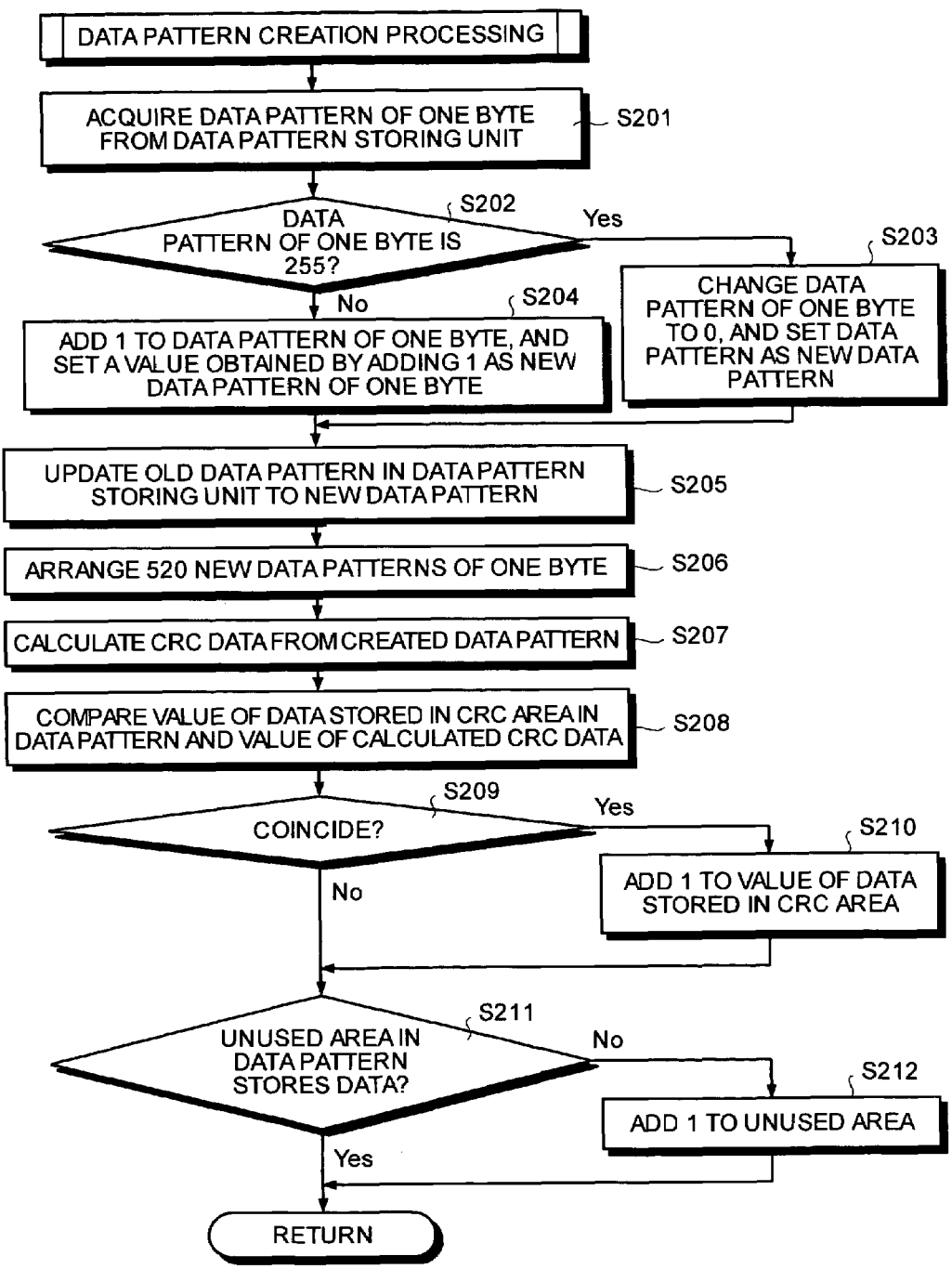
FIG. 5 is a flowchart of a processing procedure for data pattern creation.

FIG. 5 is a flowchart of a processing procedure for data pattern creation. As shown in the figure, the data pattern creating section 140b acquires a data pattern of one byte from the data pattern storing section 140a (step S201) and judges whether the data pattern of one byte is 255 (step S202).

If the data pattern of one byte is 255 (Yes in step S202), the data pattern creating section 140b changes the data pattern of one byte to 0 and sets the data pattern as a new data pattern (step S203). Then, the data pattern creating section 140b updates the old data pattern in the data pattern storing section 140a to the new data pattern (step S205).

On the other hand, if the data pattern of one byte is other than 255 (No in step S202), the data pattern creating section 140b adds 1 to the data pattern of one byte, sets a value obtained by adding 1 as a new data pattern of one byte (step S204), and shifts to step S205.

Then, the data pattern creating section 140b creates a data pattern in which 520 new data patterns of one byte are arranged (step S206), calculates CRC data from the created data pattern (step S207), compares a value of the data stored in the CRC area 210 in the data pattern and a value of the calculated CRC data (step S208), and judges whether the value of the data stored in the CRC area 210 and the value of the calculated CRC data coincide with each other (step S209).

If the value of the data stored in the CRC area 210 and the value of the calculated CRC data coincide with each other (Yes in step S209), the data pattern creating section 140b adds 1 to the value of the data stored in the CRC area 210 (step S210) and shifts to step S211.

On the other hand, if the value of the data stored in the CRC area 210 and the value of the calculated CRC data do not coincide with each other (No in step S209), the data pattern creating section 140b shifts to step S211 directly. In step S211, the data pattern creating section 140b judges whether the unused area 220c in the data pattern stores data (step S211).

If the unused area 220c does not store data (No in step S211), the data pattern creating section 140b adds 1 to the unused area 220c (step S212). If the unused area 220c stores data (Yes in step S211), the data pattern creating section 140b ends the processing.

As described above, in this embodiment, the data pattern creating section 140b creates a new data pattern every time write check is performed, the data pattern writing section 140c writes a data pattern, the data pattern reading section 140d reads a data pattern, and the comparing and judging section 140e judges whether the written data pattern and the read data pattern coincide with each other.

Therefore, a different data pattern is written every time write check is performed, and it is judged whether the written data pattern and a read data pattern coincide with each other. Thus, the conventional problem in that, even when heads cannot write a data pattern, a data pattern written previously is read and, as a result, the written data pattern and the read data pattern coincide with each other can be solved. In addition, it can be judged accurately whether the heads are normal.

When a data pattern is written in a user data area due to abnormality in a write head, an error cannot be detected if CRC data and a Block ID are appropriate. Thus, in this embodiment, CRC data and a Block ID, which are different from original ones, are included in the data pattern intentionally to make it possible to detect an error easily.

Note that, in this embodiment, data is stored in the unused area 220c to make it possible to detect an error even when a data pattern is written in a user data area due to abnormality in a write head. However, data inappropriate for a user data area may be stored in the LUN area 220a or the LBA area 220b to make it possible to detect an error.

According to the invention, a data pattern different from a data pattern created last time is created, the created data pattern is written in an input/output device as a written data pattern, the data pattern written in the input/output device is read as a read data pattern, and it is judged whether the written data pattern and the read data pattern coincide with each other. Thus, when abnormality occurs in write heads and a data pattern cannot be written accurately, a written data written previously and a read data pattern, which should be read out originally, never coincide with each other, and it can be judged whether heads are normal.

In addition, according to the invention, discriminating information for discriminating a data pattern from user data is created, and the created discriminating information is inserted in the data pattern. Thus, even if the data pattern should be written in a user data area, it can be determined easily based on the discriminating information that the data pattern is written in the user data by mistake.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An abnormality detecting device comprising:
a creating unit that creates a first data pattern including a first value of a cyclic redundancy check data in a cyclic redundancy check data area, the first data pattern being different from a single stored second data pattern created last time;
a writing unit that writes the first data pattern as a written data pattern; and
a judging unit that reads out a data pattern written in the abnormality
detecting device as a read data pattern and judges whether the written data pattern and the read data pattern coincide with each other; wherein
the creating unit calculates a second value of a cyclic redundancy check data from the first data pattern, judges whether the first value and the second value coincide with each other by comparing the first value and the second value, and inserts, into the cyclic redundancy check data area, a third value that is different from the first value by creating the third value if the first value and the second value coincide with each other.

2. The abnormality detecting device according to claim 1, further comprising a storing unit that stores the second data pattern.

3. The abnormality detecting device according to claim 2, wherein, upon creating the first data pattern, the creating unit updates the second data pattern with the first data pattern created.

4. An abnormality detecting device that checks whether writing and reading of data is performed properly using a data pattern, comprising a data pattern creating unit that calculates a first value of a cyclic redundancy check data from a created first data pattern including a second value of a cyclic redundancy check data of the created first data pattern in a cyclic redundancy check data area, judges whether the first value and the second value coincide with each other by comparing the first value and the second value, and inserts, into the cyclic redundancy check data area, a third value that is different from the second value by creating the third value if the first value and the second value coincide with each other, wherein the created first data pattern is different from a single stored previously created second data pattern.

5. A disk array device that performs writing and reading with respect to a plurality of hard disks and checks if a head included in each of the hard disks is writing data normally, comprising:
a creating unit that creates a first data pattern including a first value of a cyclic redundancy check data in a cyclic redundancy check data area, the first data pattern being different from a single stored second data pattern created last time to avoid a repetition of identical data pattern;
a writing unit that writes the first data pattern in the hard disk as a written data pattern; and
a judging unit that reads a data pattern from the hard disk as a read data pattern and judges whether the written data pattern and the read data pattern coincide with each other; wherein
the creating unit calculates a second value of a cyclic redundancy check data from the first data pattern, judges whether the first value and the second value coincide with each other by comparing the first value and the second value, and inserts, into the cyclic redundancy check data area, a third value that is different from the first value by creating the third value if the first value and the second value coincide with each other.

6. The disk array device according to claim 5, further comprising a storing unit that stores the second data pattern, wherein
the creating unit creates the first data pattern based on the second data pattern stored in the storing unit.

7. The disk array apparatus according to claim 6, wherein, upon creating a data pattern, the creating unit updates the second data pattern with the first data pattern created.

8. A checking method for checking whether writing and reading of data are performed properly using a data pattern, comprising:
creating a first data pattern including a first value of a cyclic redundancy check data in a cyclic redundancy check data area, the first data pattern being different from a single stored second data pattern created last time;
writing the first data pattern as a written data pattern;
reading out a data pattern written in the input/output device as a read data pattern; and
judging whether the written data pattern and the read data pattern coincide with each other; wherein
the creating includes calculating a second value of a cyclic redundancy check data from the first data pattern, judging whether the first value and the second value coincide with each other by comparing the first value and the second value, and inserting, into the cyclic redundancy check data area, a third value that is different from the first value by creating the third value if the first value and the second value coincide with each other.

9. A method of performing a write check to determine whether writing of data is performed properly on one or more hard disks, the method comprising:
generating a new data pattern to be written on the hard disk each time the write check is performed; and
writing the new data pattern in place of a single stored previously written data pattern;
wherein the new data pattern is generated by adjusting the single stored previously written data pattern by a predetermined value.

10. The method of claim 9, wherein the previously written data pattern and the generated new data pattern each have a size of one byte.

11. The method of claim 9, wherein the new data pattern is generated by adding a value of one to the previously written data pattern.

* * * * *